(12) United States Patent
Kamada et al.

(10) Patent No.: US 8,045,096 B2
(45) Date of Patent: Oct. 25, 2011

(54) LIGHTING UNIT INCLUDING ALTERNATELY ARRANGE FIRST AND SECOND LIGHT SOURCES, BACKLIGHT UNIT, LIQUID CRYSTAL DISPLAY DEVICE

(75) Inventors: Kentaro Kamada, Kameyama (JP); Mitsuhiro Moriyasu, Suzuka (JP); Keiji Hayashi, Kameyama (JP); Ryoh Hatakeyama, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 471 days.

(21) Appl. No.: 12/067,334

(22) PCT Filed: Jun. 15, 2006

(86) PCT No.: PCT/JP2006/312047
§ 371 (c)(1),
(2), (4) Date: Mar. 19, 2008

(87) PCT Pub. No.: WO2007/037048
PCT Pub. Date: Apr. 5, 2007

(65) Prior Publication Data
US 2009/0268125 A1 Oct. 29, 2009

(30) Foreign Application Priority Data
Sep. 28, 2005 (JP) .................... 2005-283094

(51) Int. Cl.
*G02F 1/1335* (2006.01)
*G09F 13/04* (2006.01)
(52) U.S. Cl. .............. 349/68; 349/69; 349/70; 362/97.3
(58) Field of Classification Search .................... 349/68, 349/69, 70; 362/613, 97.3; 345/102
See application file for complete search history.

(56) References Cited

U.S. PATENT DOCUMENTS

| 6,666,567 | B1 | 12/2003 | Feldman et al. |
| 6,840,646 | B2 | 1/2005 | Cornelissen et al. |
| 7,252,409 | B2 | 8/2007 | Kim |
| 7,597,451 | B2 | 10/2009 | Chikazawa et al. |
| 2005/0099791 | A1 | 5/2005 | Nagel |
| 2005/0141217 | A1 | 6/2005 | Kim |
| 2006/0002106 | A1* | 1/2006 | Hong et al. ................. 362/224 |
| 2006/0002107 | A1 | 1/2006 | Jeong |
| 2006/0002143 | A1 | 1/2006 | Gu et al. |

(Continued)

FOREIGN PATENT DOCUMENTS

| JP | 2002-063804 A | 2/2002 |
| JP | 2003-187623 A | 7/2003 |
| JP | 2003-330424 A | 11/2003 |

(Continued)

OTHER PUBLICATIONS

Official communication issued in counterpart International Application No. PCT/JP2006/312047, mailed on Sep. 19, 2006.

(Continued)

*Primary Examiner* — Michael Caley
(74) *Attorney, Agent, or Firm* — Keating & Bennett, LLP

(57) ABSTRACT

In a lighting unit, fluorescent lights and LEDs of different spectroscopic characteristics are alternately arranged in a direction X on an irradiation plane. Light sources of equal light intensity are arranged in a certain pitch for the fluorescent lights such that a uniform light amount is achieved around end portions in the direction X. The LEDs include LEDs aligned on a bottom surface of a chassis and LEDs arranged on an inner sidewall surface of the chassis. As a result, a lighting unit having a uniform amount of light across an entire irradiation plane is achieved.

11 Claims, 6 Drawing Sheets

U.S. PATENT DOCUMENTS

2006/0007682 A1 1/2006 Reiff, Jr. et al.
2006/0146570 A1 7/2006 Park

FOREIGN PATENT DOCUMENTS

JP 2004-139876 A 5/2004

OTHER PUBLICATIONS

Kentaro Kamada et al.; "Lighting Unit, Backlight Unit, and Liquid Crystal Display Device"; U.S. Appl. No. 12/067,319, filed Mar. 19, 2008.

* cited by examiner

LIGHTING UNIT INCLUDING ALTERNATELY ARRANGE FIRST AND SECOND LIGHT SOURCES, BACKLIGHT UNIT, LIQUID CRYSTAL DISPLAY DEVICE

BACKGROUND OF THE INVENTION

1. Field of the Invention

The present invention relates to a lighting unit using two types of light sources, to a backlight unit including such a lighting unit, and to a liquid crystal display device equipped the backlight unit.

2. Description of the Related Art

A liquid crystal display device is usually configured such that a backlight unit supplies a display light since a display element is non-emissive. As FIG. 6 illustrates, there is a configuration where an optical member such as a diffusing plate (not shown in FIG. 6) is combined with a lighting unit 100 that includes a plurality of aligned white light sources 101 such that the display light is provided uniformly in an in-plane direction of a display plane of the display device.

Fluorescent lights are usually used as white light sources 101 in the lighting unit 100. The use of fluorescent lights is associated with such a problem that color purity of display light generated by the fluorescent lights is low since light purity of R is generally lower than that of G or B in the fluorescent lights.

Therefore, as an art improving color reproducibility of an image on the liquid crystal display device, Japanese Unexamined Patent Application Publication No. 2004-139876 discloses a backlight unit as illustrated in FIG. 7, which includes optical members (not illustrated in FIG. 7) and a lighting unit 110 including two types of light sources; fluorescent lights 111 and LEDs (Light Emitting Diode) 112.

In the lighting unit 110, red spectrum characteristics are eliminated from the fluorescent lights 111; therefore, the fluorescent lights 111 having only blue spectrum characteristics and green spectrum characteristics are used. Combinational use of the fluorescent lights 111 with the LEDs 112 having red spectrum characteristics generate high color purity in R, G, and B. As a result, the lighting unit 110 provides high color reproducibility.

Japanese Unexamined Patent Application Publication No. 2003-187623, meanwhile, discloses a lighting unit including LEDs of plural types for emitting light of different colors.

However, the conventional configuration disclosed in Japanese Unexamined Patent Application Publication No. 2004-139876 has the following problem.

That is, in the lighting unit 110 in Japanese Unexamined Patent Application Publication No. 2004-139876, the two types of light sources must be arranged in an irradiation plane without overlapping each other. Therefore, the lighting unit 110 cannot obtain the uniform display light in both types of light sources simultaneously.

Take FIG. 7 as an example: when a pitch between neighboring fluorescent lights 111 is 2L, a pitch between the endmost fluorescent light 111 and an end portion of the lighting unit 110 is L; therefore, light outgoing from the fluorescent lights 111 will be uniform. On the other hand, the LEDs 112 are aligned respectively between the neighboring fluorescent lights 111; therefore, when a pitch between the neighboring LEDs 112 is 2L, a pitch between the endmost LED 112 and the end portion of the lighting unit 110 is 2L. As a result, the light intensity of the light outgoing from the LEDs 112 is insufficient at the end portions. Thus, the display light around the end portions of the lighting unit is bluish due to insufficient red light intensity.

SUMMARY OF THE INVENTION

In order to overcome the problems described above, preferred embodiments of the present invention provide a lighting unit where the light intensity is uniform across the entire irradiation plane.

A lighting unit according to a preferred embodiment of the present invention includes first light sources and second lights sources, having different spectroscopic characteristics and being alternately arranged in a first array direction on an irradiation plane within a chassis having an opening on an irradiation plane side, and arranged such that the second light sources located at an endmost position in the first array direction include main light sources aligned on the bottom surface of the chassis and auxiliary light sources arranged on the internal sidewall surfaces of the chassis.

As described above, in the lighting unit where the first light sources and the second light sources having different spectroscopic characterizations are alternately arranged in the first array direction, those two light sources need to be arranged without overlapping each other on the irradiation plane. Therefore, the conventional configuration, where light sources of equal light intensity are regularly arranged for the first light sources and the second light sources respectively, cannot provide display light that is uniform in both types of light sources particularly around the end portions.

On the other hand, according to the above configuration of a preferred embodiment of the present invention, the secondary light sources at the end portions in the first array direction include the main light sources on the bottom surface and the auxiliary lights sources on the inner sidewall surfaces. So, when the first light sources for emitting the same light amount are arranged in such a manner that the first light sources provide substantially uniform light intensity around the end portions, the second light sources are installed with the auxiliary light sources on the inner sidewall surfaces so as to provide the substantially uniform light intensity around the end portions. Consequently, uniform intensity of light across the irradiation plane is achieved in the lighting unit including the first light sources and the second light sources having different spectroscopic characterizations.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention are described below with reference to FIG. 1 to FIG. 5. First, a configuration of a preferred embodiment of the present invention is described below referring to FIG. 1.

Figure 1:
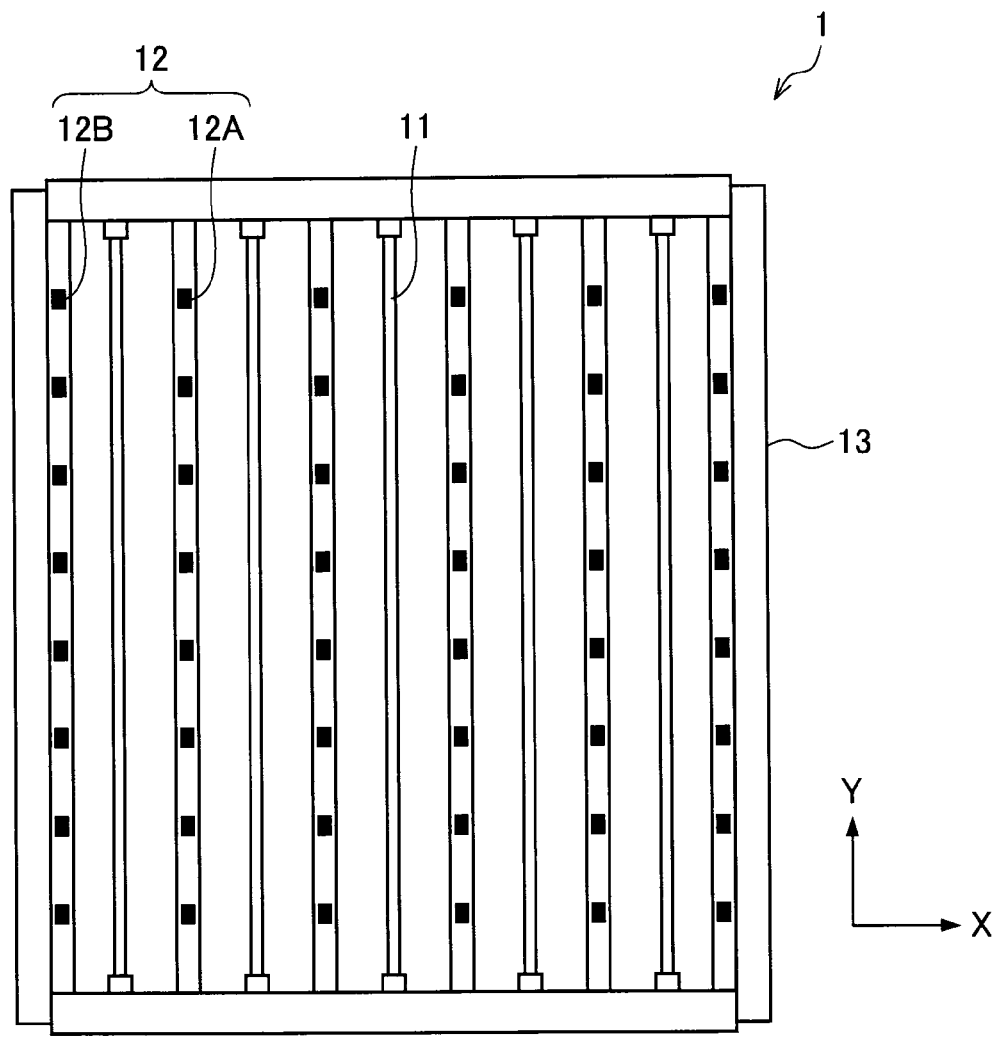
FIG. 1 is a view illustrating a preferred embodiment of the present invention, schematically illustrating a configuration of a lighting unit.
Figure 1:
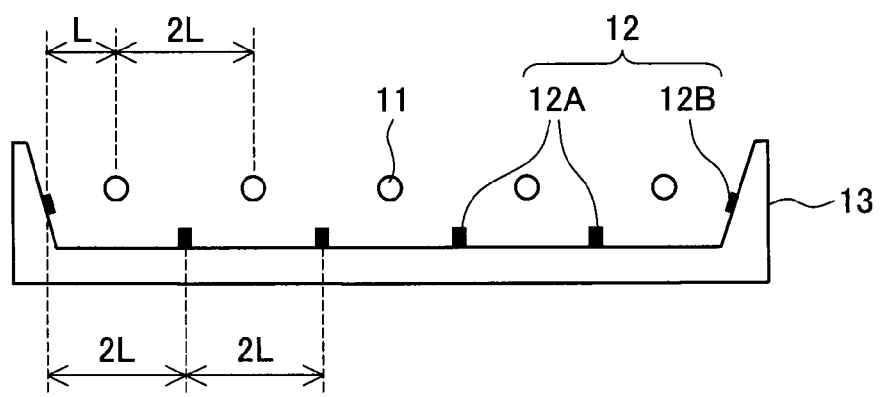

A lighting unit 1 of FIG. 1 is preferably used in a backlight unit of a transmissive, or transmissive-reflective, liquid crystal display device, and includes two types of light sources to improve color reproducibility of an image on the display device. More specifically, the lighting unit 1 includes plural fluorescent lights 11 as first light sources and plural LEDs 12 as second light sources. The fluorescent lights 11 and the LEDs 12 are alternately arranged in a direction X of FIG. 1 (the first array direction) in a chassis 13.

The first light sources have at least one of emissive spectra R, G, and B while the second light sources have the remaining(s). Any fluorescent lights high in power efficiency (for example; cold-cathode tube) are preferably used as the first light sources in preferred embodiments of the present invention, but are not limited to particular kinds of fluorescent lights. Likewise, the second light sources are not limited to the LEDs, and may be light sources such as electro-luminescence instead of the LEDs. The second light sources preferably have wide radiation directivities. The second light sources also preferably exceed the first light sources in number installed. It is also preferred that the first light sources be driven by a DC/AC convert driving method with an electric transformer while the second light sources are driven by a direct-current voltage input method. A configuration using the LEDs as the second light sources is explained below.

Suppose, for example, that red spectrum characteristics are eliminated from the fluorescent lights 11; therefore, the fluorescent light 11 have blue spectrum characteristics and green spectrum characteristics only. The LEDs 12 having red spectrum characteristics are combined with those fluorescent lights. Consequently, the lighting unit 1 achieves high color purity in R, G, and B, and realizes high color reproducibility.

The chassis 13 has an opening on a surface thereof from which irradiation light is outputted to a display panel from the light sources while inner sidewall surfaces are reflective so that the irradiation light can be used effectively.

The fluorescent lights 11 are preferably configured such that a pitch between the neighboring fluorescent lights 11 is substantially 2L, and a pitch between the endmost fluorescent light 11 and the end portion of the chassis in the direction X is substantially L. Each fluorescent light 11 illuminates areas on both sides thereof in about the L range; therefore, the outgoing light from all the fluorescent lights 11 attains substantially uniform light intensity across the irradiation plane. The irradiation plane refers to a plane parallel to the surface from which the outgoing light is outputted by the lighting unit and is expressed in a XY plane in FIG. 1.

On the other hand, the LEDs 12 are arranged so that LEDs 12A are respectively aligned between the neighboring fluorescent lights 11 while LEDs 12B are endmost at the end portions of the chassis 13. As a result, a pitch between the LEDs 12A neighboring in the direction X is substantially 2L. Likewise, a pitch between the endmost LED 12A at the end portions and the end-portion surface of the chassis 13 in the direction X is 2L. Therefore, the light intensity of the LEDs 12A is insufficient at the end portion of the chassis 13, and is not uniform across the irradiation plane. Therefore, the lighting unit 1 of the present preferred embodiment is equipped with the LEDs 12B which act as auxiliary light sources for compensating for the insufficient light intensity of the LEDs 12A (main light sources) at the end portions.

Figure 2:
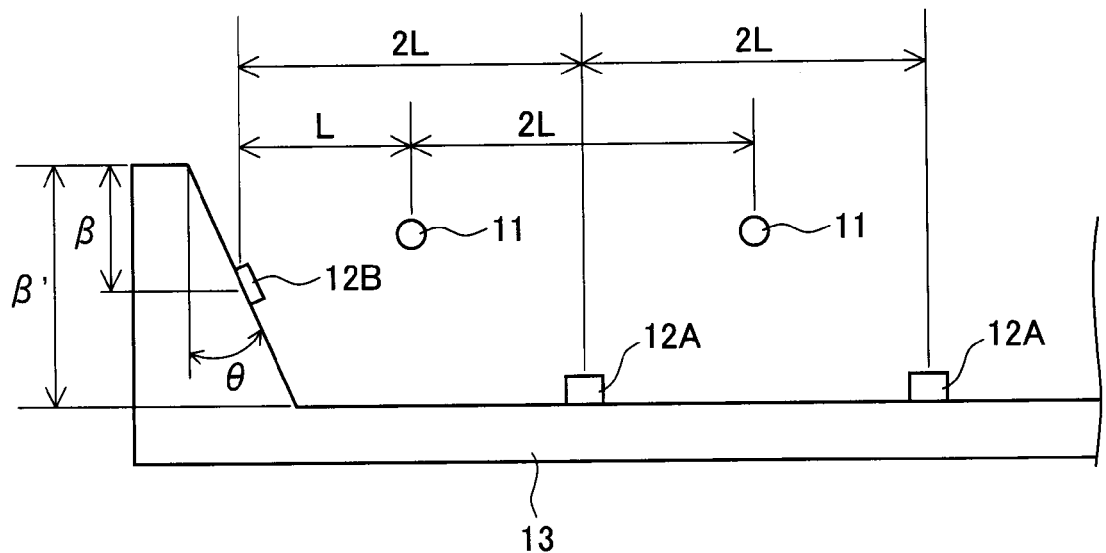
FIG. 2 is a view showing an angle at an end portion surface of the lighting unit of FIG. 1.

The inner sidewall surfaces of the chassis 13 are not necessarily vertical to an alignment surface of the light sources (in other words, the bottom surface of the chassis 13), and may have an angle of θ as FIG. 2 shows. Directivity of the irradiation light of the LEDs 12B is preferably set according to this angle θ. A relationship between the angle θ and the directivity of the LEDs 12B is described below. The angle θ mentioned here refers to an angle between the internal sidewall surface of the chassis 13 and a plane vertical to the bottom surface of the chassis 13.

The angle θ is formed to strengthen the sidewall portions of the chassis 13 at a time of module designing and is set within a range between 0 and 45 degrees. Since the LEDs 12B are attached to the sidewall portions having the angle θ, their directivities are preferred to be set according to the degrees of the angle θ.

Figure 3:
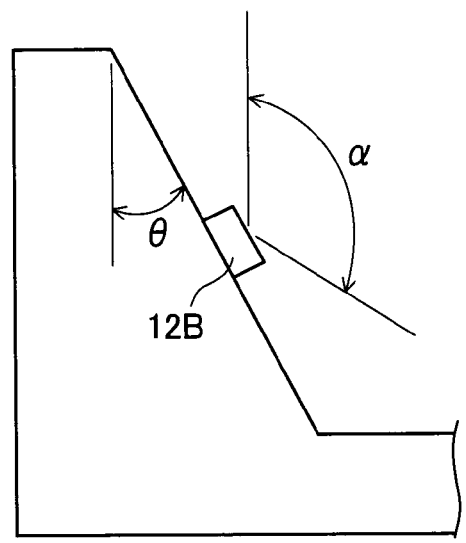
FIG. 3 is a view illustrating directivity of an LED attached to a sidewall surface of the lighting unit.

This is explained as follows with reference to FIG. 3: when an attaching surface of the chassis 13 to the LEDs 12B, or the sidewall portions of the chassis 13 in other words, has the angle θ, the irradiation light of the LEDs 12B is the most intense in a normal direction to the attaching surface. The amount of the irradiation light of the LEDs 12B decreases as an irradiation angle moves away from the normal direction. Where the amount of light provided at the irradiation angle inclining α' degrees away from the normal line to the attaching surface becomes a half of the amount of light in the normal direction, the directivity will be defined as angle α(=2α').

As far as a relationship between the angle θ and the directivity α is concerned, it is the most preferable when the formula below is satisfied:

$$(180° - \alpha)/2 = \theta, \text{ that is,}$$

$$\alpha = 180° - 2\theta.$$

The formula indicates the following condition in the lighting unit of the present preferred embodiment: when the directivity of the LEDs 12B satisfies the formula above, the irradiation angle of the light radiated by the LEDs 12B to the normal direction to the irradiation surface inclines α' degrees. In this case, the light radiated from the LEDs 12B is the most effectively used for compensating for the insufficient light intensity around the end portions so that the amount of emission at ends of the lighting unit is effectively increased.

Also, in the lighting unit of the present preferred embodiment, it is preferable that the directivity α of the LEDs 12B be greater than or equal to about 90 degrees since the angle θ is less than or equal to about 45 degrees.

Furthermore, the directivity α of the LEDs 12B is preferably set within a range of about ±20 degrees from a value calculated by the formula above. In other words, the directivity α preferably satisfies:

$$\alpha = 180° - 2\theta \pm 20°.$$

In addition, the LEDs 12B are attached on the sidewalls of the chassis 13 while the LEDs 12A are attached on the bottom surface of the chassis 13, so that the height at which the LEDs 12B are attached, (that is, a distance from the bottom surface of the chassis 13) can be differentiated from that at which the LEDs 12A are attached. The amount of light of the LEDs 12B is preferably set according to the height at which they are attached.

This is explained below by referring to FIG. 2: the amount of the light of the LEDs 12B is preferably set such that:

(the amount of the light of the LEDs 12B)=(β/β')×(the amount of the light of the LEDs 12A);

where β' is a distance between a surface on which the LEDs 12A of the chassis 13 are aligned (in other words, the bottom surface of the chassis 13) and the top surface of the chassis 13 (in other words, the back surface of the display panel of the liquid crystal display device), and β is a distance between an attachment position of the LEDs 12B and the top surface of the chassis 13.

In other words, it is preferable that the amount of light of the LEDs 12 be set according to a distance from the lower surface of the display panel, and that a light ratio between the LEDs 12A and the LEDs 12B be equivalent to a ratio of the distances from the lower surface of the display panel to them. As a result, the insufficient light intensity around the end portions of the lighting unit is properly compensated, and the entirely uniform amount of light will be gained in the lighting unit.

Meanwhile, the above explanation of the lighting unit 1 is based on the examples in which red spectrum characteristics are eliminated from the fluorescent lights 11 As a result, the fluorescent lights 11 have blue spectrum characteristics and green spectrum characteristics while only the LEDs 12 have red spectrum characteristics. However, the scope of the present invention is not limited to this exemplary configuration. In fact, the LEDs 12 may be LEDs having blue spectrum characteristics. Accordingly, blue spectrum characteristics may be eliminated from the fluorescent lights 11; therefore, the fluorescent lights 11 having red spectrum characteristics and green spectrum characteristics may be combined with the LEDs 12.

Furthermore, in the configuration where the second light sources are LEDs, the second light sources may be LEDs having more than two different spectroscopic characteristics. For example, LEDs having red spectrum characteristics and LEDs having blue spectrum characteristics may be used for the LEDs 12 while fluorescent light to be combined with them may have at least green spectrum characteristics (the fluorescent lights may also have spectrum characteristics other than green ones). With the configuration in which the LEDs having more than two different spectroscopic characteristics are used, the present invention is applicable to provide uniform light intensity in a direction Y that is perpendicular to the direction X on the irradiation plane.

Figure 4:
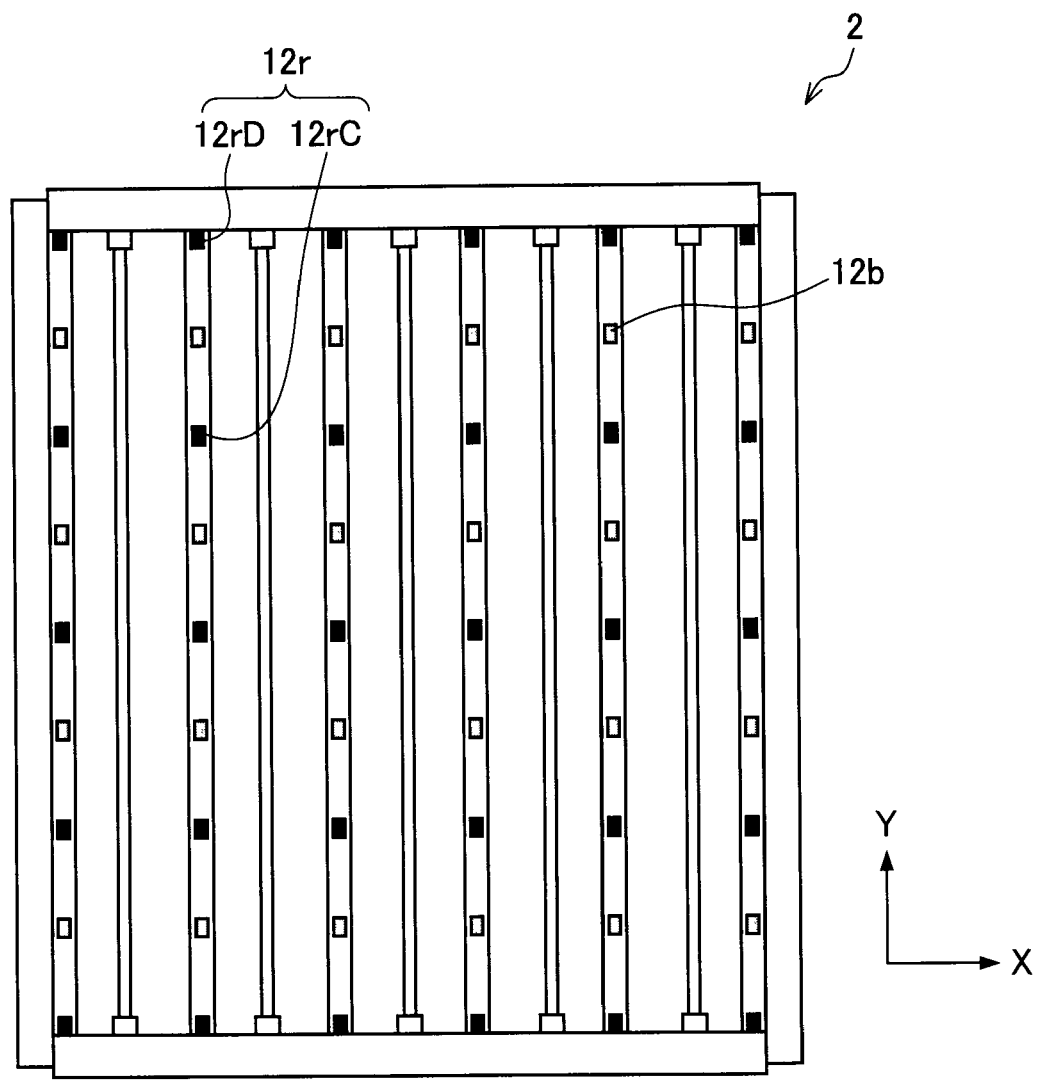
FIG. 4 is a view illustrating a preferred embodiment of the present invention, schematically illustrating a configuration of a lighting unit.

FIG. 4 shows an exemplary configuration where LEDs 12r having red spectrum characteristics are used with LEDs 12b having blue spectrum characteristics. In the lighting unit 2 of FIG. 4, the LEDs 12r and the LEDs 12b are alternately arranged in a single row of the LEDs 12 that is arranged between the neighboring fluorescent lights 11. At the end portions of the array direction of the single row of the LEDs 12 (that is, the direction Y of FIG. 4: a second array direction), auxiliary LEDs for compensating for insufficient light intensity are provided. In FIG. 4, the LEDs 12r having red spectrum characteristics are provided as the auxiliary LEDs for compensating for the insufficient light intensity at the end portions of the direction Y, yet the LEDs 12 having blue spectrum characteristics may be provided instead. Furthermore, the LEDs as the auxiliary light sources provided at the end portions may be mixture of the LED having blue spectrum characteristics and the LEDs having red spectrum characteristics. The amount of light and the directivity of the LEDs 12D provided for compensating for the insufficient light intensity around the end portions of the direction Y are preferably set in a same manner in which the amount of light and the directivity of the LEDs 12B are set. That is to say, in the configuration of FIG. 4, the LEDs 12r having red spectrum characteristics include main light sources 12rC and auxiliary light sources 12rD.

Moreover, the lighting unit of the present preferred embodiment may be equipped with a light controller arranged to control emission intensity of at least either the first light sources or the second light sources therewith. By this, it is possible to blend the light of the both light sources with good balance to provide white light, which makes the lighting unit suitable to be used as a backlight.

Figure 5:
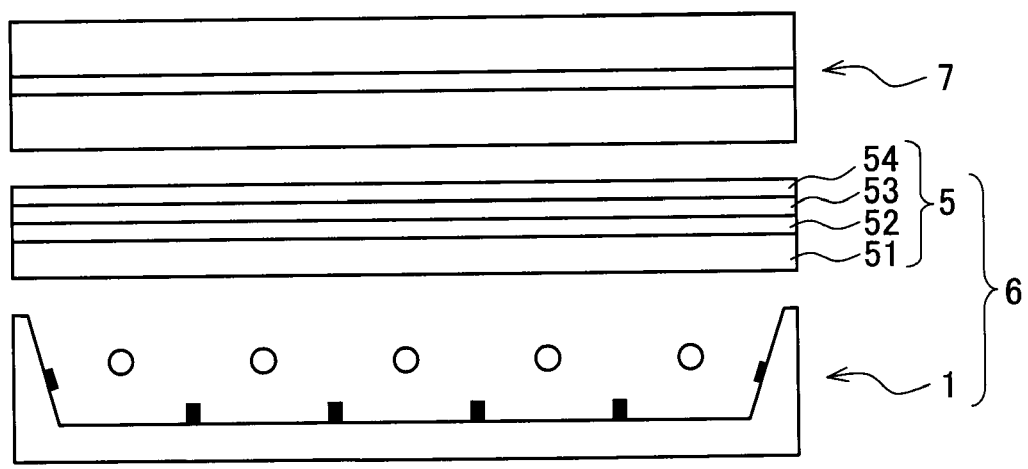
FIG. 5 is a view schematically illustrating a configuration of a liquid crystal display device equipped with the lighting unit in FIG. 1.
Figure 6:
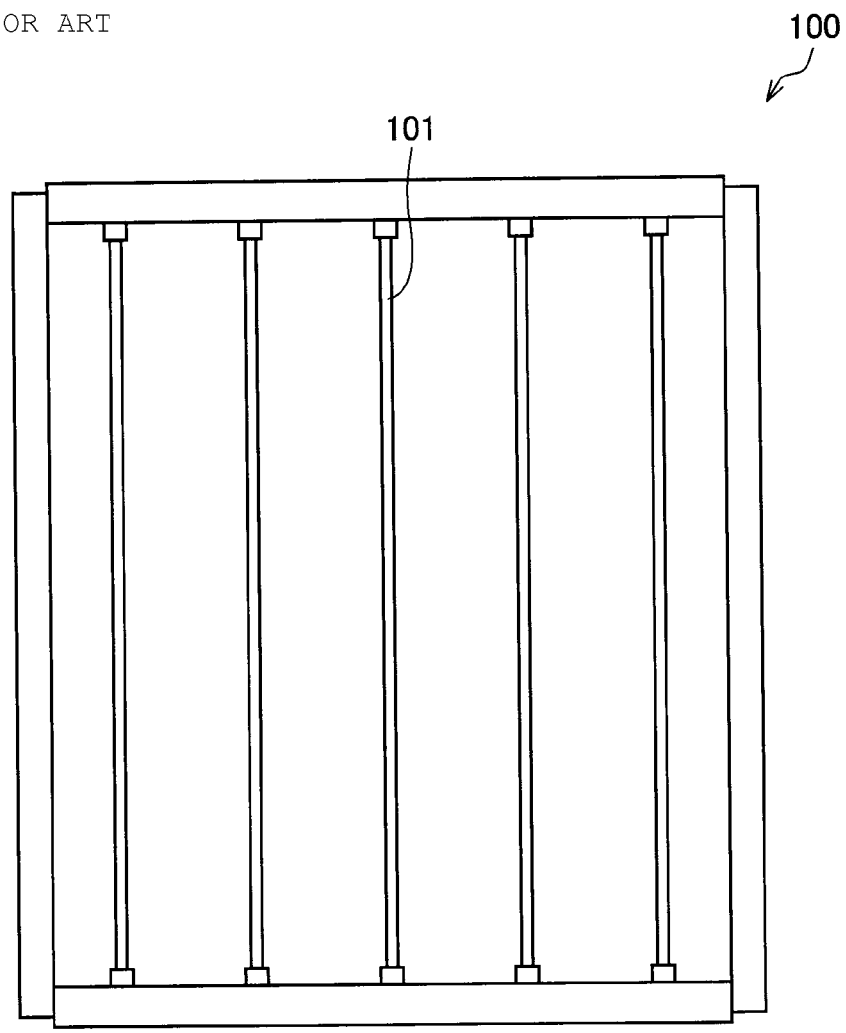
FIG. 6 is a view schematically illustrating a configuration of a conventional lighting unit.
Figure 6:
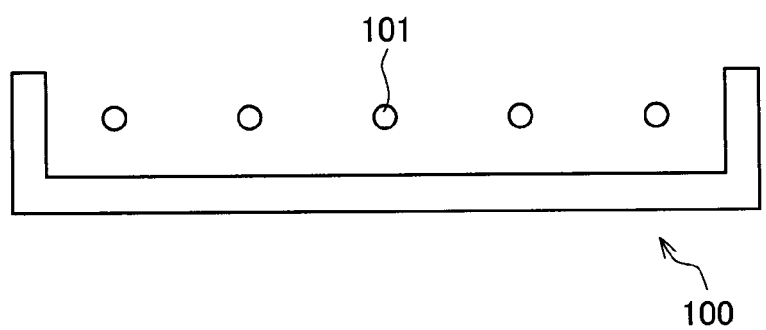
Figure 7:
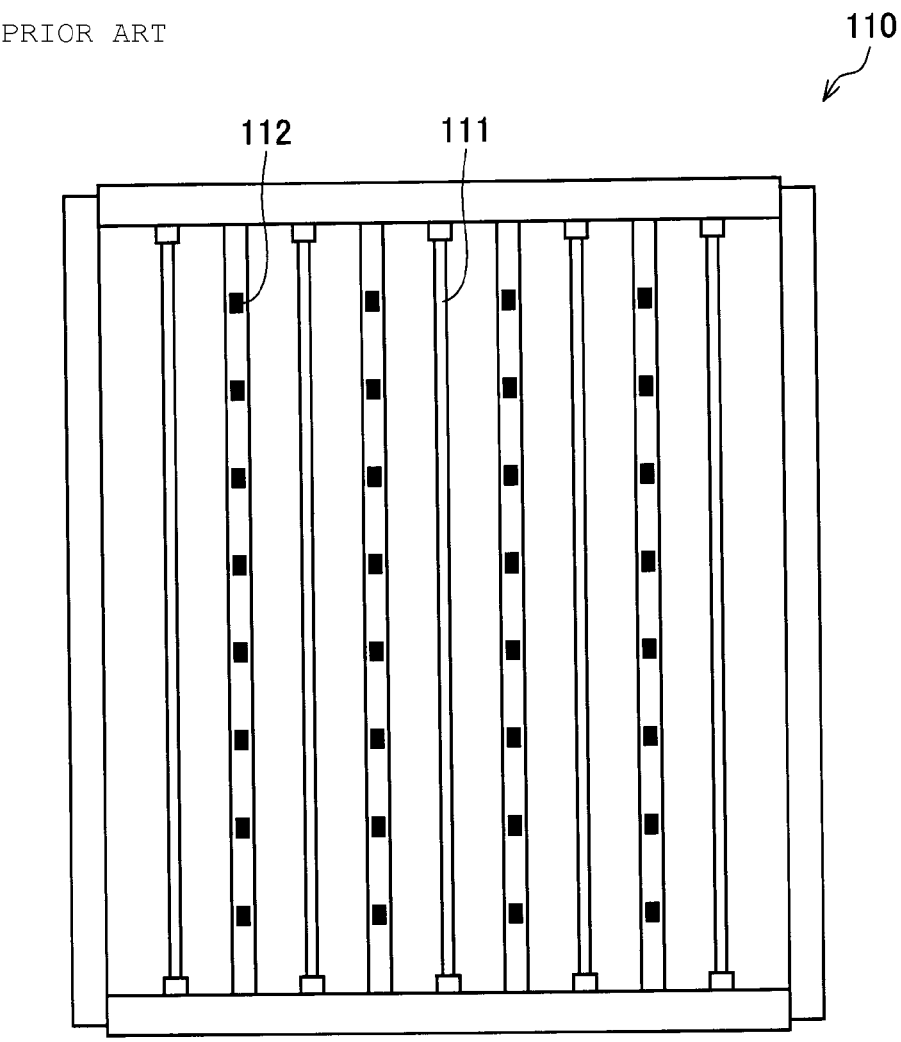
FIG. 7 is a view schematically illustrating a configuration of a conventional lighting unit.
Figure 7:
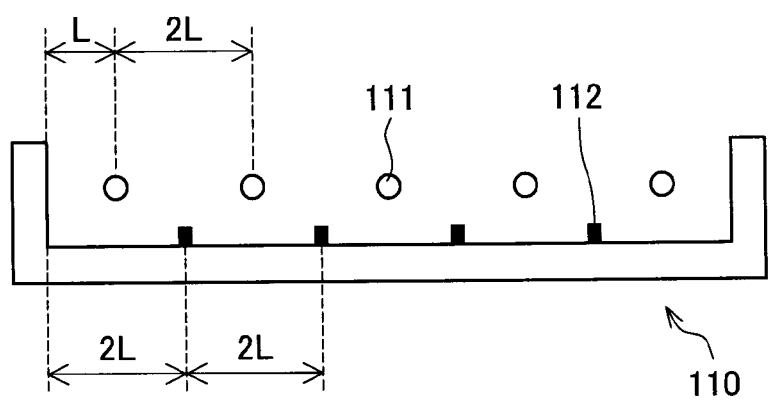

When the lighting unit 1 or 2 described above is used as a backlight unit of a liquid crystal display device, an optical member, which provides the light distribution characteristic and the brightness distribution characteristic to the irradiation light, is provided on the outputting side of the lighting unit. For example, a backlight unit 6 of FIG. 5 includes an optical member 5 including: a diffusing plate 51; a diffusing sheet 52; a prism sheet 53; and a reflection polarization sheet 54. FIG. 5 illustrates the configuration using the lighting unit 1, and the lighting unit 2 may be equipped with the optical member 5 to be used as the backlight unit.

Furthermore, the backlight unit 6 will be installed with a liquid crystal display panel 7 to display an image, when it is used in a liquid crystal display device.

As described above, the lighting unit according to various preferred embodiments of the present invention including the first light sources and the second lights sources, having the different spectroscopic characteristics and being alternately arranged in the first array direction on the irradiation plane within the chassis having the opening on the irradiation plane side, is arranged such that the second light sources endmost in the first array direction include the main light sources aligned on the bottom surface of the chassis and the auxiliary light sources arranged on the internal sidewall surfaces of the chassis.

As described above, in the lighting unit where the first light sources and the second light sources having different spectroscopic characterizations are alternately arranged in the first array direction, those two light sources need to be arranged without overlapping each other on the irradiation plane. Therefore, the conventional configuration, where light sources of equal light intensity are regularly arranged for the first light sources and the second light sources, respectively, cannot provide the uniform display light in the both types of light sources particularly around the end portions.

On the other hand, according to the above-described configuration of preferred embodiments of the present invention, the second light sources at the end portions in the first array direction include the main light sources on the bottom surface and the auxiliary light sources on the inner sidewall surfaces. So, when the first light sources for emitting the same light amount are arranged in such a manner that the first light sources provide a substantially uniform amount of light around the end portions, the second light sources are installed with the auxiliary light sources on the inner sidewall surfaces so as to provide the substantially uniform amount of light around the end portions. Consequently, a uniform amount of light across the irradiation plane is achieved in the lighting unit including the first light sources and the second light sources having different spectroscopic characterizations.

The lighting unit is preferably arranged such that the first light sources are fluorescent lights and the second light sources are LEDs or electro-luminescent light sources.

According to the lighting unit described above, the first light sources are the fluorescent lights that are high in power efficacy (cold-cathode tubes, for example); furthermore, the second light sources provide a color having a low color purity. As a result, a lighting unit having high color reproducibility can be realized.

The lighting unit above is preferably configured such that:

$$\alpha = 180° - 2\theta \pm 20°;$$

where θ is the angle between the inner sidewall surface of the chassis and the surface vertical to the bottom surface of the chassis, and α is the range of outputting angles that allows the auxiliary light sources to emit an amount of light approximately 50% to 100% of an amount of light outputted in a normal direction to the surface where the auxiliary light sources are arranged.

According to the lighting unit described above, the irradiation light from the auxiliary light sources is most effectively used for compensating for the insufficient light intensity around the end portions of the lighting unit, so that the amount of emission at the end portions of the lighting unit is effectively increased.

The lighting unit is preferably configured such that:

(the amount of light of the auxiliary light source)=(β/β')×(the amount of light of the main light source);

where β' is a distance between the surface on which the main light sources of the chassis are aligned and the top surface of the chassis, and β is a distance between the attachment position of the auxiliary lights sources and the top surface of the chassis.

According to the lighting unit described above, the light ratio between the main light sources and the auxiliary light sources is equivalent to the ratios of the distances from the lower surface of the display panel to them. As a result, the insufficient light intensity around the end portions of the lighting unit is properly compensated, and an entirely uniform amount of light emission will be achieved in the lighting unit.

The lighting unit is preferably configured such that the second light sources include two types of the LEDs, which respectively have different spectroscopic characteristics and are alternately arranged in the second array direction perpendicular to the first array direction on the irradiation plane, and at least either of the two types of LEDs endmost in the second array direction includes the main light sources on the bottom surface and the auxiliary light sources on the inner sidewall surfaces.

According to the lighting unit described above, light sources of equal light intensity are regularly arranged for either of the two types of the LEDs such that substantially uniform light amount can be gained around the end portions in the second array direction, whereas the auxiliary light sources are installed on the sidewall surfaces of the chassis for the other type of LEDs such that substantially uniform light amount can be gained around the above area. Consequently, the light amount uniform across the entire irradiation plane will be gained in the lighting unit including the first light sources and the second light sources of different spectroscopic characteristics.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

The invention claimed is:

1. A lighting unit comprising:
a chassis including an opening on an irradiation plane side;
first light sources and second light sources respectively having different spectroscopic characteristics, the first light sources and the second light sources being alternately arranged in a first array direction in the chassis; wherein
the second light sources comprise a main light source aligned on a bottom surface of the chassis and an auxiliary light source arranged on an inner sidewall surface of the chassis;
the second light sources consisting of two types of LEDs respectively having different spectroscopic characteristics, the two types of the LEDs are alternately arranged in a second array direction that is perpendicular or substantially perpendicular to the first array direction;
at least one of the two types of LEDs comprises the main light source aligned on the bottom surface and the auxiliary light source arranged on the inner sidewall surface; and
the first light sources and the second light sources are arranged such that light emitted only from the first light sources has uniform light intensity across an irradiation plane, and light emitted only from the second light sources has uniform light intensity across the irradiation plane.

2. The lighting unit as set forth in claim 1, wherein the first light sources have at least one of emissive spectra R, G, and B and the second light sources have the remaining emissive spectra.

3. The lighting unit as set forth in claim 1, wherein the first light sources are fluorescent lights and the second light sources are LEDs or electro-luminescent light sources.

4. The lighting unit as set forth in claim 1, wherein $$\alpha = 180° - 2\theta \pm 20°,$$

where θ is an angle between the inner sidewall surface of the chassis and a surface vertical to the bottom surface of the chassis, and α is a range of outputting angles that allows the auxiliary light sources to emit an amount of light that is about 50% to about 100% of an amount of light outputted in a normal direction to a surface where the auxiliary light sources are arranged.

5. The lighting unit as set forth in claim 1, wherein (an amount of light of the auxiliary light source)=(β/β')×(an amount of light of the main light source)

where β' is a distance between a surface on which the main light sources of the chassis are aligned and a top surface of the chassis, and β is a distance between an attachment position of the auxiliary light source and the top surface of the chassis.

6. The lighting unit as set forth in claim 1, wherein the first light sources are driven by a DC/AC conversion driving method with an electric transformer while the second light sources are driven by a direct-current voltage input method.

7. The lighting unit as set forth in claim 1, further comprising a light controller arranged to control brightness of the light sources wherein emission intensity of at least either the first light sources or the second light sources is controlled by the light controller.

8. The lighting unit as set forth in claim 1, wherein the second light sources have a relatively wide radiation directivity as compared to the first light sources.

9. The lighting unit as set forth in claim 1, wherein the second light sources exceed the first light sources in number.

10. A backlight unit comprising:

a lighting unit as set forth in claim 1; and an optical member arranged to provide a light distribution characteristic and a brightness distribution characteristic to irradiation light of the lighting unit.

11. A liquid crystal display device comprising:

a backlight unit as set forth in claim 10; and a liquid crystal display panel arranged to receive light from the backlight unit and generate a display.

* * * * *